United States Patent [19]

Sivaramakrishnan

[11] 4,374,226
[45] Feb. 15, 1983

[54] POLYCARBONATE HAVING IMPROVED HYDROLYTIC STABILITY

[75] Inventor: Parameswar Sivaramakrishnan, New Martinsville, W. Va.

[73] Assignee: Mobay Chemical Corporation, Pittsburgh, Pa.

[21] Appl. No.: 929,758

[22] Filed: Jul. 31, 1978

Related U.S. Application Data

[63] Continuation-in-part of Ser. No. 866,881, Jan. 4, 1978, abandoned, which is a continuation of Ser. No. 777,205, Mar. 14, 1977, abandoned, which is a continuation of Ser. No. 659,316, Feb. 19, 1976, abandoned.

[51] Int. Cl.$^3$ ............................................. C08K 5/09
[52] U.S. Cl. ................................................. 524/399
[58] Field of Search ................. 260/45.75 W, 18 TN; 524/399

[56] References Cited

U.S. PATENT DOCUMENTS

| 3,475,372 | 10/1969 | Gable | 260/18 TN |
| 3,535,300 | 10/1970 | Gable | 260/45.75 |
| 3,763,063 | 10/1973 | Factor | 260/18 TN |
| 3,769,367 | 10/1973 | Factor | 260/45.7 P |
| 3,809,676 | 5/1974 | Liberti | 260/18 TN |

Primary Examiner—V. P. Hoke
Attorney, Agent, or Firm—Gene Harsh; Lawrence S. Pope; Thomas W. Roy

[57] ABSTRACT

Polycarbonates are provided with hydrolytic stability by combining the polycarbonate polymer with a carboxylic acid salt of cadmium. The cadmium salt provides improved hydrolytic stability to both polycarbonates based on diphenols and halogenated diphenols over conventional stabilizers, and does not detrimentally affect other properties such as color stability, haze, initial tensile strength and elongation.

5 Claims, No Drawings

POLYCARBONATE HAVING IMPROVED HYDROLYTIC STABILITY

This application is a continuation in part of our co-pending application Ser. No. 866,881 filed Jan. 4, 1978 now abandoned which itself is a continuation of application Ser. No. 777,205 filed Mar. 14, 1977, now abandoned, which in turn is a continuation of our application Ser. No. 659,316, filed Feb. 19, 1976, now abandoned.

BACKGROUND OF THE INVENTION

1. Field of the Invention

This invention relates to polycarbonates and more particularly to polycarbonates having improved hydrolytic stability.

2. Description of the Prior Art

Polycarbonates derived from reactions involving organic dihydroxy compounds and carbonic acid derivatives have found extensive commercial application because of their excellent mechanical and physical properties. These thermoplastic polymers are particularly suited for the manufacture of molded products where impact strength, rigidity, toughness, thermal and dimensional stability as well as excellent electrical properties are required.

Further in many applications, especially those requiring extensive service in the presence of heat and light, polycarbonates are used because of their resistance to these constant conditions. The polycarbonates resistance to extensive light and heat is in many instances attributable to stabilizers which prevent deterioration of optical and molecular properties. Among the most extensively used stabilizers are the neutral esters of phosphorous acid including the alkyl and aryl phosphites and the oxetane phosphites. More extensive discussions involving some phosphite stabilizers can be found in U.S. Pat. No. 3,794,629. Although these stabilizers are effective in protecting the polycarbonate from heat and light they cause the polycarbonate to deteriorate, due to hydrolysis, when exposed to water under elevated temperatures.

In some applications polycarbonates are provided with enhanced flame retardant characteristics by using aromatic diols with bromine or chlorine atoms which have a tendency to free radically dissociate and degrade the polycarbonate. To prevent this degradation phosphites have also been added. However, the phosphites, just as in the case of the non-halogenated polycarbonates have a tendency to make the polycarbonate more susceptible to hydrolytic attack.

Thus in accordance with the present invention polycarbonates are provided having improved hydrolytic stability over conventional stabilizers yet with the other desirable properties of the polycarbonate left substantially unmodified.

SUMMARY OF THE INVENTION

A polycarbonate is provided with enhanced hydrolytic stability which is comprised of an effective amount of a carboxylic acid salt of cadmium and a polycarbonate resin.

DETAILED DESCRIPTION OF THE INVENTION

When used herein "polycarbonate resin" means the neat resin without additives; "Polycarbonate" means both the formulated polycarbonate resin with additives therein and also the final molded plastic product.

The polycarbonate resins useful in practice of the invention are those having a weight average molecular weight between 10,00 and 200,000 and more preferably a melt flow rate range of 1 to 24 g/10 min at 300° C. (ASTM 1238) and are produced by reacting di-(monohydroxyaryl)alkanes or dihydroxybenzenes and substituted dihydroxybenzenes with derivatives of the carbonic acids such as carbonic acid diester, phosgene, bis-chloro-carbonic acid esters of di-(monohydroxyaryl)-alkanes and the bis-chloro-carbonic acid esters of the dihydroxybenzenes and the substituted dihydroxybenzenes.

The two aryl residues of the di-(monohydroxyaryl)alkanes applied according to the invention can be alike or different. The aryl residues can also carry substituents which are not capable of reacting in the conversion into polycarbonates, such as halogen atoms or alkyl groups, for example, the methyl, ethyl, propyl or tert-butyl groups. The alkyl residue of the di-(monohydroxyaryl)alkanes linking the two benzene rings can be an open chain or a cycloaliphatic ring and may be substituted if desired, for example by an aryl residue.

Suitable di-(monohydroxyaryl)-alkanes are for example (4,4'-dihydroxy-diphenyl)-methane, 2,2'-(4,4'-dihydroxy-diphenyl)-propane, 1,1-(4,4'-dihydroxy-diphenyl)cyclohexane, 1,1-(4,4'-dihydroxy-3,3'-dimethyl-diphenyl)cyclohexane, 1,1-(2,2'-dihydroxy-4,4'-dimethyl-diphenyl)butane, 2,2-(2,2'-dihydroxy-4,4'-di-tert.-butyl-diphenyl)propane or 1,1'-(4,4'-dihydroxy-diphenyl)-1-phenyl-ethane, furthermore methane derivatives which carry besides two hydroxyaryl groups an alkyl residue with at least two carbon atoms and a second alkyl residue with one or more carbon atoms, such as 2,2-(4,4'-dihydroxy-diphenyl)-butane, 2,2-(4,4'-dihydroxy-diphenyl)-pentane (melting point 149°–150° C.), 3,3-(4,4'-dihydroxy-diphenyl)-pentane, 2,2-(4,4'-dihydroxy-diphenyl)-hexane, 3,3-(4,4'-dihydroxydiphenyl)-hexane, 2,2-(4,4'-dihydroxy-diphenyl)-4-methylpentane, 2,2-(4,4'-dihydroxy-diphenyl)-heptane, 4,4-(4,4'-dihydroxy-diphenyl)-heptane (melting point 148°–149° C.) or 2,2-(4,4'-dihydroxy-diphenyl)-tri-decane. Suitable di-(monohydroxyaryl)-alkanes, the two aryl residues of which are different are, for example, 2,2-(4,4'-dihydroxy-3'-methyl-diphenyl)-propane and 2,2-(4,4'-dihydroxy-3-methyl-3'-isopropyl-diphenyl)-butane. Suitable di-(monohydroxyaryl)-alkanes, the aryl residues of which carry halogen atoms are for instance 2,2-(3,5,3'5'-tetrachloro-4,4'-dihydroxy-diphenyl)-propane, 2,2-(3,5,3'5'-tetrabromo-4,4'-dihydroxy-diphenyl)-propane, (3,3'-dichloro-4,4'-dihydroxy-diphenyl)-methane and 2,2'-dihydroxy-5,5'-difluoro-diphenyl-methane. Suitable di-(monohydroxyaryl)-alkanes, the alkyl residue of which, linking the two benzene rings, is substituted by an aryl residue are for instance (4,4'-dihydroxydiphenyl)-phenyl-methane and 1,1-(4,4'-dihydroxydiphenyl)-1-phenyl-ethane.

Suitable dihydroxybenzenes and substituted dihydroxybenzenes are hydroquinone, resorcinol, pyrocatecol, methyl hydroquinone and the like. Other suitable dihydroxyaromatic compounds are 4,4'-dihydroxydiphenyl, 2,2'-dihydroxy-diphenyl, dihydroxynaphthalene, dihydroxyanthracene and compounds represented by the structural formula:

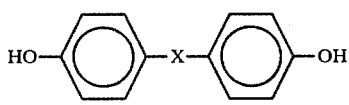

wherein X is

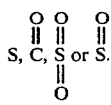

In order to obtain special properties, mixtures of various di-(monohydroxyaryl)-alkanes can also be used, thus mixed polycarbonate resins are obtained. By far the most useful polycarbonate resins are those based on 4,4'-dihydroxy-diaryl methanes and more particularly bisphenol A [2,2-(4,4'dihydroxy-diphenyl)-propane]. Thus when flame retardant characteristics are to be imparted to the basic polycarbonate resin, a mixture of bisphenol A and tetrabromobisphenol A [2,2-(3,5,3'5'-tetrabromo-4,4'dihydroxy-diphenyl)-propane] is utilized when reacting with phosgene or a like carbonic acid derivative.

The polycarbonates resins are prepared by methods known to those skilled in the art and more particularly by methods disclosed in U.S. Pat. Nos. 3,028,365, 2,999,846, 3,248,414, 3,153,008, 3,215,668, 3,187,065, 2,970,137, 2,991,273 and 2,999,835 all incorporated herein by reference.

In some uses, pigments may be added to the polycarbonate to form opaque colored molded products. The pigments used to opacify and color the polycarbonate are those conventionally known to skilled artisans for use in high molecular weight thermoplastic pigmentation. By far titanium dioxide is the most preferred pigment to opacify and whiten molded articles because of its high index of refraction, extreme whiteness and brightness. However, other white pigments such as lithopone, zinc sulfide, zinc oxide, antimony trioxide, and the like may be used. To impart color (other than white) to the polycarbonate pigments such as red lead, cuprous oxide, cadmium reds, cinnabar, antimony vermilion (red and brown pigments); zinc yellow, chrome yellows and oranges, cadmium yellow, antimony yellow, (orange and yellow pigments); chrome greens, chrome oxide greens (green pigments); cobalt blue, lampblacks, vegetable blacks, animal blacks (black pigments) and the like may be used.

In addition to the inorganic pigments, recited above, organic pigments may be used such as pigment chlorine, lithol fast yellow, touidine red, permanent orange and the like. Dyes may be added to impart color to the polycarbonate such as the phthalocyanies, the anthraquinones and the like.

The cadmium salts homogeneously incorporated in the polycarbonate which are useful in the practice of the invention are those which are soluble in the polycarbonate resin and readily incorporated therein and based on carboxylic acids and cadmium. In particular, cadmium 2-ethylhexanoate, cadmium laurate, cadmium octoate and cadmium acetate have found the most extensive utility for providing increased hydrolytic stability to the polycarbonate in the practice of the invention.

When cadmium 2-ethylhexanoate is used in the practice of the invention preferably a 66 weight percent solid solution of cadmium 2-ethylhexanoate is incorporated into the polycarbonate at a level of 0.01 to 0.1 percent by weight based on the weight of the polycarbonate resin cadmium laurate is also added to the polycarbonate in an amount between 0.01 and 0.1% by weight based on the weight of the polycarbonate resin.

The invention will be further illustrated by way of the following examples.

EXAMPLE I

A polycarbonate resin which was the reaction product of bisphenol A and phosgene having a melt flow at 300° C. of 3 to 6 grams/10 min. (ASTM D1238) was tinted with 0.00093 g of an anthraquinone blue dye per pound of polycarbonate resin and 0.00064 g of an anthraquinone violet blue dye per pound of polycarbonate resin; 0.05 percent by weight, based on the polycarbonate resin of a 66 weight percent solution of cadmium 2-ethylhexanoate was incorporated into the polycarbonate. The polycarbonate resin, the cadmium 2-ethylhexanoate and the tint were tumble blended and then extruded into pellets; ⅛" sample bars were prepared for impact, tensile and elongation testing. Further the impact and tensile bars were tested for hydrolytic stability. The test results for hydrolytic stability are reported on table I. The samples were tested after oven aging at 130° C. for tensile strength and elongation; the results of the oven aging tests are reported on table II. Tests for optical and melt stability were conducted by molding specimens at 520° F. and 700° F. and by aging the polycarbonate at 375° C. The results of the optical and melt stability tests are reported on table III. The effect of hydrolysis on aging the molded samples at 82° C. in water were conducted; the results of these tests are reported on table IV. Oven aging tests at 130° C. were conducted to determine the effect of such aging on optical properties; the results of such tests are reported on table V. In all of the examples the percentage of cadmium 2-ethylhexanoate shown is that of a 66 percent solids solution thereof.

EXAMPLE II–IX

Example I was repeated except that the stabilizer and pigmentation were varied. The following formulations keyed to the specific examples show the constituents of the particular polycarbonate.

| Example | Formulation |
| --- | --- |
| Example II | Polycarbonate resin of Example I |
| | 0.00093g/lb polycarbonate resin of anthraquinone blue dye |
| | 0.00064g/lb polycarbonate resin of anthraquinone violet dye |
| | 0.05% phenylneopentyl phosphite |
| Example III | Polycarbonate resin of Example I |
| | 0.00093g/lb polycarbonate resin of anthraquinone blue dye |
| | 0.00064g/lb polycarbonate resin of anthraquinone violet dye |
| | 0.08% tris(3-ethyl-3-methylol oxetane) phosphite |
| Example IV | Polycarbonate resin of Example I |
| | 0.00093g/lb polycarbonate resin of anthraquinone blue dye |
| | 0.00064g/lb polycarbonate resin of anthraquinone violet dye |
| | 1.36g/lb of polycarbonate resin of hydroxybenzotriazole |
| | 0.05% cadmium 2-ethylhexanoate solution |
| Example V | Polycarbonate resin of Example I |
| | 0.00093g/lb polycarbonate resin of anthraquinone blue dye |
| | 0.00064g/lb polycarbonate resin of |

| Example | Formulation |
|---|---|
| | anthraquinone violet dye |
| | 1.36g/lb of polycarbonate resin of hydroxy-benzotriazole |
| | 0.05% phenylneopentyl phosphite |
| Example VI | Polycarbonate resin of Example I |
| | 0.00093g/lb polycarbonate resin of anthraquinone blue dye |
| | 0.00064g/lb polycarbonate resin of anthraquinone violet dye |
| | 1.36g/lb polycarbonate resin of hydroxybenzotriazole |
| | 0.08% tris(3-ethyl-3-methylol oxetane)-phosphite |
| Example VII | Polycarbonate resin of Example I |
| | 0.00093g/lb polycarbonate resin of anthraquinone blue dye |
| | 0.00064g/lb polycarbonate resin of anthraquinone violet dye |
| | 0.5% the cerotic acid ester of ceryl alcohol |
| | 1.36g/lb polycarbonate resin of hydroxybenzotriazole |
| | 0.05% cadmium 2-ethylhexanoate solution |
| Example VIII | Polycarbonate resin of Example I |
| | 0.00093g/lb polycarbonate resin of anthraquinone blue dye |
| | 0.00064g/lb polycarbonate resin of |

| Example | Formulation |
|---|---|
| | anthraquinone violet dye |
| | 0.5% the cerotic acid ester of ceryl alcohol |
| | 1.36g/lb polycarbonate resin of hydroxybenzotriazole |
| | 0.05% phenylneopentyl phosphite |
| Example IX | Polycarbonate resin of Example I |
| | 0.00093g/lb polycarbonate resin of anthraquinone blue dye |
| | 0.00064g/lb polycarbonate resin of anthraquinone violet dye |
| | 0.5% of the cerotic acid ester of ceryl alcohol |
| | 1.36g/lb of hydroxybenzotriazole |
| | 0.08% tris(3-ethyl-3-methylol-oxetane) phosphite |

The cerotic acid ester of ceryl alcohol is incorporated into the polycarbonate as a mold release in accordance with the teachings of U.S. Pat. No. 3,836,499 incorporated herein by reference.

The hydroxybenzotriazole is a stabilizer for resistance to ultraviolet light. The polycarbonates of Examples II through IX were prepared and tested in accordance with Example I. The results of the tests are reported in the following tables.

TABLE I

EFFECT ON TENSILE, ELONGATION AND IMPACT PROPERTIES OF POLYCARBONATES HAVING VARIOUS STABILIZERS THEREIN DURING AGING IN WATER AT 82° C.

| Example | Stabilizer | Stabilizer Concn. % | Tensile Yield Str. psi | Tensile Ult. Str. psi | Elong. Yield % | Elong. Ult. % | Impact Ft.-Lbs. |
|---|---|---|---|---|---|---|---|
| | | | Control (Unaged) | | | | |
| I | cadmium 2-ethyl-hexanoate | 0.05 | 9000 | 9200 | 8 | 100 | 20.68 |
| II | phenylneopentyl phosphite | 0.05 | 9133 | 9400 | 8 | 102 | 18.91 |
| III | oxetane phosphite[1] | 0.08 | 9400 | 9400 | 8 | 100 | 19.06 |
| IV | cadium 2-ethyl-hexanoate | 0.05 | 8933 | 9000 | 8 | 100 | 18.34 |
| V | phenylneopentyl phosphite | 0.05 | 9300 | 9000 | | | 17.28 |
| VI | oxetane phosphite | 0.08 | 9867 | 9867 | 3–10 | 103 | 17.10 |
| VII | cadmium 2-ethyl-hexanoate | 0.05 | 9300 | 9617 | 10 | 106 | 19.06 |
| VIII | phenylneopentyl phosphite | 0.05 | 9600 | 9600 | 11 | 102 | 18.25 |
| IX | oxetane phosphite | 0.08 | 9867 | 9867 | 11 | 102 | 17.51 |
| | | | 3 Days | | | | |
| I | cadmium 2-ethyl-hexanoate | 0.05 | 9200 | 9200 | 6 | 20–80 | 16.95 |
| II | phenylneopentyl phosphite | 0.05 | 9800 | 9800 | 6 | 6–95 | 11.46 |
| III | oxetane phosphite[1] | 0.08 | 10100 | 10100 | 6 | 7–45 | 15.74 |
| IV | cadmium 2-ethyl-hexanoate | 0.05 | 9800 | 9800 | 6 | 45–90 | 12.3 |
| V | phenylneopentyl phosphite | 0.05 | 10000 | 10000 | 7 | 90 | 2.58 |
| VI | oxetane phosphite | 0.08 | 10500 | 10500 | 6 | 7.45 | 2.92 |
| VII | cadmium 2-ethyl-hexanoate | 0.05 | 9600 | 9600 | 7 | 20–105 | 2.22 |
| VIII | phenylneopentyl phosphite | 0.05 | 10000 | 10000 | 7 | 65 | 1.97 |
| IX | oxetane phosphite | 0.08 | 10300 | 10300 | 5 | 5 | 2.09 |
| | | | 6 Days | | | | |
| I | cadmium 2-ethyl-hexanoate | 0.05 | 9600 | 9600 | 6 | 5–70 | 15.61 |
| II | phenylneopentyl phosphite | 0.05 | 9900 | 9900 | 5 | 20–90 | 2.54 |
| III | oxetane phosphite[1] | 0.08 | 10200 | 10200 | 6 | 8 | 15.52 |
| IV | cadmium 2-ethyl-hexanoate | 0.05 | 10000 | 10000 | 6 | 35–100 | 2.68 |
| V | phenylneopentyl phosphite | 0.05 | 10200 | 10200 | 7 | 40 | 1.95 |
| VI | oxetane phosphite | 0.08 | 8300 | 8300 | 6 | 7 | 2.27 |
| VII | cadmium 2-ethyl-hexanoate | 0.05 | 9700 | 9700 | 6 | 6–60 | 2.06 |
| VIII | phenylneopentyl phosphite | 0.05 | 10200 | 10200 | 7 | 80 | 1.52 |

TABLE I-continued
EFFECT ON TENSILE, ELONGATION AND IMPACT PROPERTIES OF POLYCARBONATES HAVING VARIOUS STABILIZERS THEREIN DURING AGING IN WATER AT 82° C.

| | | | | | | | |
|---|---|---|---|---|---|---|---|
| IX | oxetane phosphite | 0.08 | 10600 | 10600 | 5 | 15–60 | 1.68 |
| | | | | 12 Days | | | |
| I | cadmium 2-ethyl-hexanoate | 0.05 | 9500 | 9500 | 8 | 20–95 | 15.74 |
| II | phenylneopentyl phosphite | 0.05 | 9900 | 9900 | 8 | 20 | 1.75 |
| III | oxetane phosphite[1] | 0.08 | 10100 | 10100 | 8 | 8 | 2.1 |
| IV | cadmium 2-ethyl-hexanoate | 0.05 | 4300 | 4300 | 4 | 4 | Fail |
| V | phenylneopentyl phosphite | 0.05 | 4500 | 4500 | 4 | 4 | Fail |
| VI | oxetane phosphite | 0.08 | 1200 | 1200 | <2 | <2 | Fail |
| VII | cadmium 2-ethyl-hexanoate | 0.05 | 9600 | 9600 | 8 | 8–35 | Fail |
| VIII | phenylneopentyl phosphite | 0.05 | 5800 | 5800 | 4 | 4 | Fail |
| IX | oxetane phosphite | 0.08 | 3000 | 3000 | 2 | 2 | Fail |

| Example | Stabilizer | Stabilizer Concn. % | Tensile Yield Str. psi | Tensile Ult. Elong. psi | Elong. Yield psi | Elong. Ult. % | Impact Ft.-lbs. |
|---|---|---|---|---|---|---|---|
| | | | | 24 Days | | | |
| I | cadmium 2-ethyl-hexanoate | 0.05 | 9800 | 7300–9800 66% high | 5 | 5–40 | 11.3 |
| II | phenylneopentyl phosphite | 0.05 | 10150 | 7300–10200 67% low | 5 | 5–20 66% high | 0.6 |
| III | oxetane phosphite[1] | 0.08 | — | 10567 | 2 | | 1.6 |
| IV | cadmium 2-ethyl-hexanoate | 0.05 | — | 1900 | — | 1 | Fail |
| V | phenylneopentyl phosphite | 0.05 | — | 2000 | — | 1 | Fail |
| VI | oxetane phosphite | 0.08 | — | 800 | — | 1 | Fail |
| VII | cadmium 2-ethyl-hexanoate | 0.05 | 4400 | 4400 | <1 | 1 | Fail |
| VIII | phenylneopentyl phosphite | 0.05 | — | 1867 | — | 1 | Fail |
| IX | oxetane phosphite | 0.08 | — | 1200 | — | 1 | Fail |

[1] oxetane phosphite is tris(3-ethyl-3-methylol oxetane)phosphite.

TABLE II
EFFECT ON TENSILE AND ELONGATION PROPERTIES OF POLYCARBONATES HAVING VARIOUS STABILIZERS THEREIN DURING OVEN AGING AT 130° C.

| Example | Stabilizer | Stabilizer Concn. % | Tensile Yield Str. psi | Tensile Ult. Str. psi | Elong. Yield % | Elong. Ult. % |
|---|---|---|---|---|---|---|
| | | | | Control | | |
| I | cadmium 2-ethyl-hexanoate | 0.05 | 9000 | 9200 | 8 | 100 |
| II | phenylneopentyl phosphite | 0.05 | 8933 | 9000 | 8 | 100 |
| III | oxetane phosphite[1] | 0.08 | 9300 | 9617 | 10 | 106 |
| IV | cadmium 2-ethyl-hexanoate | 0.05 | 9133 | 9400 | 8 | 102 |
| V | phenylneopentyl phosphite | 0.05 | 9300 | 9000 | 8 | 100 |
| VI | oxetane phosphite | 0.08 | 9600 | 9600 | 11 | 102 |
| VII | cadmium 2-ethyl-hexanoate | 0.05 | 9400 | 9400 | 8 | 100 |
| VIII | phenylneopentyl phosphite | 0.05 | 9867 | 9867 | 8 | 103 |
| IX | oxetane phosphite | 0.08 | 9867 | 9867 | 11 | 102 |
| | | | | 3 Days | | |
| I | cadmium 2-ethyl-hexanoate | 0.05 | 10600 | 10600 | 8 | 75 |
| II | phenylneopentyl phosphite | 0.05 | 10600 | 10600 | 8 | 90 |
| III | oxetane phosphite[1] | 0.08 | — | — | — | — |
| IV | cadmium 2-ethyl-hexanoate | 0.05 | 11000 | 11000 | 8 | 30–105 |
| V | phenylneopentyl phosphite | 0.05 | 11000 | 11000 | 8 | 10–70 |
| VI | oxetane phosphite | 0.08 | 11000 | 11000 | 8 | 40–105 |
| VII | cadmium 2-ethyl-hexanoate | 0.05 | 11400 | 11400 | 8 | 20 |
| VIII | phenylneopentyl phosphite | 0.05 | 11300 | 11300 | 8 | 25 |

TABLE II-continued

EFFECT ON TENSILE AND ELONGATION PROPERTIES OF POLYCARBONATES HAVING VARIOUS STABILIZERS THEREIN DURING OVEN AGING AT 130° C.

| Example | Stabilizer | Stabilizer Concn. % | Tensile Yield Str. psi | Tensile Ult. Str. psi | Elong. Yield % | Elong. Ult. % |
|---|---|---|---|---|---|---|
| IX | oxetane phosphite | 0.08 | 11200 | 11200 | 8 | 10-55 |
| *6 Days* | | | | | | |
| I | cadmium 2-ethyl-hexanoate | 0.05 | 11000 | 11000 | 9 | 30-100 |
| II | phenylneopentyl phosphite | 0.05 | 7666 | 11033 | 9 | 42 |
| III | oxetane phosphite[1] | 0.08 | 8000 | 11000 | 9 | 90 |
| IV | cadmium 2-ethyl-hexanoate | 0.05 | 8000 | 11433 | 10 | 20-50 |
| V | phenylneopentyl phosphite | 0.05 | 8033 | 11466 | 9 | 45 |
| VI | oxetane phosphite | 0.08 | 7966 | 11200 | 9 | 35-105 |
| VII | cadmium 2-ethyl-hexanoate | 0.05 | 11933 | 11933 | 11 | 14 |
| VIII | phenylneopentyl phosphite | 0.05 | 10400 | 11266 | 10 | 20 |
| IX | oxetane phosphite | 0.08 | 8233 | 11233 | 8 | 25-70 |
| *12 Days* | | | | | | |
| I | cadmium 2-ethyl-hexanoate | 0.05 | 11300 | 11300 | 7 | 30-75 |
| II | phenylneopentyl phosphite | 0.05 | 11400 | 11400 | 8 | 20 |
| III | oxetane phosphite[1] | 0.08 | 11400 | 11400 | 8 | 10-85 |
| IV | cadmium 2-ethyl-hexanoate | 0.05 | 11500 | 11500 | 7 | 10-75 |
| V | phenylneopentyl phosphite | 0.05 | 11500 | 11500 | 8 | 10-50 |
| VI | oxetane phosphite | 0.08 | 12000 | 12000 | 8 | 10-50 |
| VII | cadmium 2-ethyl-hexanoate | 0.05 | 11800 | 11800 | 7 | 38 |
| VIII | phenylneopentyl phosphite | 0.05 | 11500 | 11500 | 7 | 22 |
| IX | oxetane phosphite | 0.08 | 11800 | 11800 | 8 | 10-25 |
| *24 Days* | | | | | | |
| I | cadmium 2-ethyl-hexanoate | 0.05 | 10800 | 10800 | 8 | 88 |
| II | phenylneopentyl phosphite | 0.05 | 10800 | 10800 | 8 | 15 |
| III | oxetane phosphite[1] | 0.08 | 10400 | 10400 | 8 | 45 |
| IV | cadmium 2-ethyl-hexanoate | 0.05 | 10900 | 10900 | 8 | 50-105 |
| V | phenylneopentyl phosphite | 0.05 | 10900 | 10900 | 7 | 40-85 |
| VI | oxetane phosphite | 0.08 | 11100 | 11100 | 8 | 11-75 |
| VII | cadmium 2-ethyl-hexanoate | 0.05 | 11200 | 11200 | 7 | 7-75 |
| VIII | phenylneopentyl phosphite | 0.05 | 11600 | 11600 | 8 | 11 |
| IX | oxetane phosphite | 0.08 | 11400 | 11400 | 8 | 12 |

[1]oxetane phosphite is tris(3-ethyl-3-methylol oxetane)phosphite.

TABLE III

OPTICAL AND MELT STABILITY PROPERTIES OF POLYCARBONATE USING VARIOUS STABILIZERS

| Example | Stabilizer | Stabilizer Concn. % | 520° F. Molding Y % | 520° F. Molding YI | 520° F. Molding % Haze | 700° F. Molding Y % | 700° F. Molding YI | Irradiation Y % | Irradiation YI | Melt Stability at 375° C. APHA color |
|---|---|---|---|---|---|---|---|---|---|---|
| I | cadmium 2-ethylhexanoate | 0.05 | 84.31 | 0.68 | 1.06 | 84.79 | 2.38 | 83.89 | 10.43 | 900 |
| II | phenyl-neopentyl phosphite | 0.05 | 84.85 | 1.49 | 1.18 | 83.70 | 2.88 | 84.35 | 12.09 | 800-900 |
| III | oxetane phosphite[1] | 0.08 | 85.26 | −0.86 | | 85.61 | −0.41 | 84.20 | 9.49 | >1000 |
| IV | cadmium 2-ethylhexanoate | 0.05 | 84.32 | 1.10 | 1.2 | 84.36 | 3.17 | 83.15 | 4.65 | >1000 |
| V | phenyl-neopentyl phosphite | 0.05 | 85.32 | 1.51 | 1.2 | 85.28 | 3.41 | 84.33 | 6.06 | >1000 |
| VI | oxetane phosphite | 0.08 | 85.23 | −0.45 | 1.0 | 84.01 | 3.49 | 84.42 | 3.50 | >1000 |
| VII | cadmium 2-ethylhexanoate | 0.05 | 80.19 | 2.53 | 1.08 | 79.82 | 5.22 | 80.99 | 6.09 | >>1000 |
| VIII | phenyl- | 0.05 | 84.59 | 0.22 | 1.20 | 83.98 | 2.18 | 84.09 | 4.35 | >>1000 |

TABLE III-continued

OPTICAL AND MELT STABILITY PROPERTIES OF POLYCARBONATE USING VARIOUS STABILIZERS

| Example | Stabilizer | Stabilizer Concn. % | 520° F. Molding Y % | YI | % Haze | 700° F. Molding Y % | YI | Irradiation Y % | YI | Melt Stability at 375° C. APHA color |
|---|---|---|---|---|---|---|---|---|---|---|
| IX | neopentyl phosphite oxetane phosphite | 0.08 | 84.83 | −0.96 | 1.20 | 82.84 | 5.06 | 83.78 | 3.13 | >>1000 |

[1] oxetane phosphite is tris(3-ethyl-3-methylol oxetane) phosphite.

TABLE IV

EFFECT ON OPTICAL PROPERTIES OF POLYCARBONATE HAVING VARIOUS STABILIZERS ON AGING IN WATER AT 82° C.

| Example | Stabilizer | Concn. | Y % | YI | Haze % |
|---|---|---|---|---|---|
| | | | Unaged | | |
| I | cadmium 2-ethyl-hexanoate | (0.05%) | 84.31 | 0.68 | 1.06 |
| II | phenylneopentyl phosphite | (0.05%) | 84.85 | 1.49 | 1.18 |
| III | oxetane phosphite[1] | (0.08%) | 85.26 | −0.86 | |
| IV | cadmium 2-ethyl-hexanoate | (0.05%) | 84.32 | 1.10 | 1.2 |
| V | phenylneopentyl phosphite | (0.05%) | 85.32 | 1.51 | 1.2 |
| VI | oxetane phosphite | (0.08%) | 85.23 | −0.45 | 1.0 |
| | | | 3 Days | | |
| I | cadmium 2-ethyl-hexanoate | (0.05%) | 83.91 | 1.20 | 1.70 |
| II | phenylneopentyl phosphite | (0.05%) | 84.82 | 1.78 | 1.0 |
| III | oxetane phosphite[1] | (0.08%) | 85.09 | −0.81 | 2.0 |
| IV | cadmium 2-ethyl-hexanoate | (0.05%) | 83.97 | 1.19 | 3.0 |
| V | phenylneopentyl phosphite | (0.05%) | 84.66 | 1.87 | 1.6 |
| VI | oxetane phosphite | (0.08%) | 85.22 | −0.59 | 1.4 |
| | | | 6 Days | | |
| I | cadmium 2-ethyl-hexanoate | (0.05%) | 84.86 | 1.29 | 1.60 |
| II | phenylneopentyl phosphite | (0.05%) | 85.72 | 2.08 | 1.7 |
| III | oxetane phosphite[1] | (0.08%) | 85.99 | −0.37 | 1.6 |
| IV | cadmium 2-ethyl-hexanoate | (0.05%) | 84.85 | 1.47 | 1.5 |
| V | phenylneopentyl phosphite | (0.05%) | 84.80 | 1.97 | 1.9 |
| VI | oxetane phosphite | (0.08%) | 85.72 | −0.27 | 1.7 |
| | | | 12 Days | | |
| I | cadmium 2-ethyl-hexanoate | (0.05%) | 84.35 | 1.23 | 1.16 |
| II | phenylneopentyl phosphite | (0.05%) | 85.15 | 2.12 | 1.62 |
| III | oxetane phosphite[1] | (0.08%) | 85.32 | −0.54 | 1.77 |
| IV | cadmium 2-ethyl-hexanoate | (0.05%) | — | — | — |
| V | phenylneopentyl phosphite | (0.05%) | 84.96 | 2.06 | 1.52 |
| VI | oxetane phosphite | (0.08%) | 85.22 | −0.38 | 0.84 |
| | | | 24 Days | | |
| I | cadmium 2-ethyl-hexanoate | (0.05%) | 83.98 | 1.56 | 3.1 |
| II | phenylneopentyl phosphite | (0.05%) | 83.95 | 3.45 | 4.7 |
| III | oxetane phosphite[1] | (0.08%) | 84.66 | 0.62 | 5.1 |
| IV | cadmium 2-ethyl-hexanoate | (0.05%) | 83.39 | 1.60 | 2.4 |
| V | phenylneopentyl phosphite | (0.05%) | 83.64 | 4.21 | 4.9 |
| VI | oxetane phosphite | (0.08%) | 84.53 | 0.80 | 3.3 |

[1] oxetane phosphite is tris(3-ethyl-3-methylol oxetane) phosphite.

TABLE V

EFFECT ON OPTICAL PROPERTIES OF POLYCARBONATE WITH VARIOUS STABILIZERS DURING OVEN AGING AT 130° C.

| Example | Stabilizer | Concn. | Y % | YI | Haze % |
|---|---|---|---|---|---|
| | | | Unaged | | |
| I | cadmium 2-ethyl-hexanoate | (0.05%) | 84.31 | 0.68 | 1.06 |
| II | phenylneopentyl phosphite | (0.05%) | 84.85 | 1.49 | 1.18 |
| III | oxetane phosphite[1] | (0.08%) | 85.26 | −0.86 | 1.42 |
| IV | cadmium 2-ethyl-hexanoate | (0.05%) | 84.32 | 1.10 | 1.2 |
| V | phenylneopentyl phosphite | (0.05%) | 85.32 | 1.51 | 1.2 |
| VI | oxetane phosphite | (0.08%) | 85.23 | −0.45 | 1.0 |
| | | | 3 Days | | |
| I | cadmium 2-ethyl-hexanoate | (0.05%) | 84.17 | 1.35 | 1.13 |
| II | phenylneopentyl phosphite | (0.05%) | 84.62 | 2.00 | 1.48 |
| III | oxetane phosphite[1] | (0.08%) | 85.49 | −0.73 | 1.01 |
| IV | cadmium 2-ethyl-hexanoate | (0.05%) | 83.63 | 1.48 | 1.70 |
| V | phenylneopentyl phosphite | (0.05%) | 84.92 | 2.01 | 1.21 |
| VI | oxetane phosphite | (0.08%) | 85.07 | −0.64 | 1.32 |
| | | | 6 Days | | |
| I | cadmium 2-ethyl-hexanoate | (0.05%) | 84.17 | 1.51 | 1.2 |
| II | phenylneopentyl phosphite | (0.05%) | 83.05 | 2.27 | 1.6 |
| III | oxetane phosphite[1] | (0.08%) | 85.48 | −0.69 | 1.4 |
| IV | cadmium 2-ethyl-hexanoate | (0.05%) | 84.05 | 1.61 | 1.9 |
| V | phenylneopentyl phosphite | (0.05%) | 84.74 | 2.28 | 1.8 |
| VI | oxetane phosphite | (0.08%) | 85.16 | −0.54 | 1.3 |
| | | | 12 Days | | |
| I | cadmium 2-ethyl-hexanoate | (0.05%) | 82.88 | 2.02 | — |
| II | phenylneopentyl phosphite | (0.05%) | 83.64 | 3.09 | — |
| III | oxetane phosphite[1] | (0.08%) | 84.37 | −0.76 | — |
| IV | cadmium 2-ethyl-hexanoate | (0.05%) | 82.89 | 2.17 | — |
| V | phenylneopentyl phosphite | (0.05%) | 82.69 | 4.03 | — |
| VI | oxetane phosphite | (0.08%) | 83.78 | −0.33 | — |
| | | | 24 Days | | |
| I | cadmium 2-ethyl-hexanoate | (0.05%) | 82.86 | 2.56 | 2.7 |
| II | phenylneopentyl phosphite | (0.05%) | 80.97 | 5.87 | 3.5 |
| III | oxetane phosphite[1] | (0.08%) | 84.20 | 3.89 | 2.8 |
| IV | cadmium 2-ethyl-hexanoate | (0.05%) | 82.01 | 3.21 | 3.4 |
| V | phenylneopentyl phosphite | (0.05%) | 79.66 | 8.49 | 3.4 |
| VI | oxetane phosphite | (0.08%) | 83.71 | 0.50 | 3.9 |

[1] oxetane phosphite is tris(3-ethyl-3-methylol oxetane) phosphite.

In table I the data show the cadmium 2-ethylhexanoate stabilized polycarbonate to have improved elongation and impact properties over polycarbonate formulated with conventional stabilizers after aging under hydrolyzing conditions.

In table II the data shows no reduction in oven heat aging properties using cadmium 2-ethylhexanoate.

In table III the data demonstrate that cadmium 2-ethylhexanoate imparts substantially similar optical and melt stabilities to those obtained using other commercial stabilizers. The samples prepared for table III were molded at two different temperatures 520° F. and 700° F. The variable Y is a measure of brightness and is better with the higher value. YI is the yellowness index, the closer the number is to zero the better the color of the polycarbonate article. Irradiation designates the brightness and yellowness after 310 hrs. after exposure of the polycarbonate article to sunlamp light. The samples for irradiation testing were molded between 540° and 570° F.

As is demonstrated by the above examples, cadmium organic salts provide enhanced hydrolytic stability to polycarbonates over conventional stabilizer without detrimentally effecting the other desirable physical properties for which polycarbonates are used.

EXAMPLE X

A polycarbonate resin which was the reaction product of bisphenol A and phosgene having a melt flow rate at 300° C. of 6 to 12 g/10 min (ASTM 1238) was tumble blended with a copolycarbonate resin based on bisphenol A and tetrabromobisphenol A having 10 percent by weight bromine therein. The blended resin had a melt flow rate at 300° C. of 6 to 12 g/10 min. (ASTM 1238). Sufficient copolymer was used to impart 5% bromine to the total polycarbonate mixture. 0.1 percent by weight based on the weight of total polycarbonate and copolycarbonate resin of a 66% cadmium 2-ethylhexanoate solution was also tumble blended with the resins. The tumble blend was extruded and cut into pellets. The pellets were molded and tested for impact half-life testing. The impact half-life durability is the time taken during aging at 70° F. and 100% relative humidity for the sample to reach one-half of its original impact strength. The test results are reported on Table VI.

EXAMPLES XI and XII

Example X was repeated substituting the conventional stabilizers distearyl pentaerythritol diphosphite (Example XI) and tri (mixed mono and dinonyl phenyl) phosphites (Example XII). Test results are reported on Table VI.

EXAMPLE XIII

Example X was repeated except no stabilizer was added to the polycarbonate. Test results are reported on Table VI.

TABLE VI

IMPACT STRENGTH HALF-LIFE ON AGING AT 70° C. WITH 100% RELATIVE HUMIDITY

| Example | Stabilizer | Stabilizer Concn. | Half Life (Days) |
|---|---|---|---|
| X | cadmium 2-ethylhexanoate | 0.1 | 65 |
| XI | distearyl pentaerythritol diphosphite | 0.1 | 48.3 |
| XII | tri (mixed mono and dinonyl phenyl) phosphites | 0.1 | 56.8 |
| XIII | | | 87.1 |

As is demonstrated by Table VI cadmium 2-ethylhexanoate provides improved hydrolytic stability over conventional polycarbonate stabilizers. However, the cadmium 2-ethylhexanoate stabilized polycarbonate is worse in hydrolytic stability than the neat resin. It is necessary to add a stabilizer to the polycarbonate to provide protection from heat and light. The cadmium salts of the invention provide this protection to halogenated polycarbonate resins while imparting improved hydrolytic stability over conventional stabilizers.

TABLE VII

CONCENTRATION OF ADDITIVES IN PC FOR COMPARATIVE TESTING OF RETENTION OF OVERALL PROPERTIES DURING AGING

| | | Wt % PC | Molecular Formula | Molecular Wt |
|---|---|---|---|---|
| 1. | Cadmium 2-ethylhexanoate | 0.05 | $C_{16}H_{30}O_4$ Cd | 398.74 |
| 2. | Cadmium Octoate | 0.033 | $C_{16}H_{30}O_4$ Cd | 398.74 |
| 3. | Cadmium Laurate | 0.042 | $C_{24}H_{46}O_4$ Cd | 510.95 |
| 4. | Cadmium Valerate | 0.026 | $C_{10}H_{18}O_4$ Cd | 314.58 |
| 5. | Cadmium Myristate | 0.047 | $C_{28}H_{54}O_4$ Cd | 567.05 |
| 6. | Cadmium Palmitate | 0.052 | $C_{32}H_{62}O_4$ Cd | 623.16 |
| 7. | Cadmium Stearate | 0.056 | $C_{36}H_{70}O_4$ Cd | 679.32 |
| 8. | Cadmium Acetate | 0.015 | $C_4H_6O_4$ Cd | 230.49 |
| 9. | Zinc Octoate | 0.035 | $C_{16}H_{30}O_4$ Zn | 351.77 |

5.9 g of cadmium octoate was mixed with 4.1 g of phenyl diphenyl phosphinite* and the combined mixture was heated to 100° C. for 1 hour. This mixture was used in compounding with polycarbonate.
10. 0.10% of a mixture of cadmium octoate and phenyl diphenyl phosphinite (in 5.9/4.1 ratio)
11. 0.30% of a mixture of cadmium octoate and phenyl diphenyl phosphinite (in 5.9/4.1 ratio)
12. The polycarbonate resin (MERLON M-50) which was utilized for comparative testing was the reaction product of bisphenol A and phosgene having a melt flow at 300° C. of 3 to 6 grams/10 min. (ASTM D-1238) and having a natural color of 7.5. The additives (1–11 above) were incorporated into the polycarbonate using a dry blend/extrusion compounding technique.
The properties studied for comparison of effectiveness were:
(a) Impact retention at 105° C. (dry air aging) and at 82° C. (180° F.) aging in water;
(b) Critical thickness property loss during dry air aging at 105° C. and water aging at 82° C. (180° F.);
(c) Retention of tensile properties at 130° C. (dry air aging) and at 82° C. (aging in water);
(d) Color retention between moldings at 520° F. and 700° F.;
(e) Discoloration (measured by yellowness index changes) during dry air aging at 130° C.
13. All of the additives were compounded with polycarbonate at the same mol percent level.

*Phenyl diphenyl phosphinite was prepared from the reaction of phenyl dichlorophosphine and phenol in presence of TEA. The crude product obtained was redistilled.

TABLE VIII

EFFECT ON IMPACT PROPERTIES (NOTCHED) OF M-50 COMPOUNDED WITH VARIOUS ADDITIVES DURING OVEN AGING AT 130° C. AND WATER AGING AT 82° C.

| | Cadmium 2-ethyl-hexanoate | Cadmium Laurate | Cadmium Octoate | Cadmium Valerate | Cadmium Stearate | Cadmium Palmitate | Cadmium Acetate | Cadmium Myristate | Cadmium Octoate/ Phenyl diphenyl phosphinite | |
|---|---|---|---|---|---|---|---|---|---|---|
| Additive Wt % | 0.05 | 0.042 | 0.033 | 0.026 | 0.056 | 0.052 | 0.015 | 0.047 | 0.059/0.041 | 0.177/0.122 |
| Impact Properties | | | | | | | | | | |
| Aged in Oven at 105° C. | | | | | | | | | | |
| ⅛" Notched Izod ft lbs/in | | | | | | | | | | |
| (0 hr) | 17.32 17.45 | 17.61 17.99 | 17.98 17.33 | 17.58 | 17.58 | 17.13 | 17.40 | 16.87 | 14.51 17.50 | 13.30 16.17 |
| (8 hrs) | 17.76 — | 17.74 — | 17.42 — | 12.44 | — | 2.67 | — | 2.10 | 2.41 — | 1.67 — |
| (16 hrs) | 17.69 — | 17.37 — | 13.25 — | 7.37 | — | 2.09 | — | 1.99 | 1.92 — | 1.51 — |
| (24 hrs) | — 16.86 | — 17.52 | — 16.99 | — | 7.76 | — | 17.12 | — | — 1.89 | — 1.17 |
| (32 hrs) | 17.24 — | 17.27 — | 12.36 — | 2.18 | — | 2.09 | — | 1.63 | 1.73 — | — — |
| (64 hrs) | 11.94 — | 7.77 — | 2.20 — | 1.84 | — | 1.84 | — | 1.42 | 1.63 — | — — |
| (72 hrs) | — 16.82 | — 12.30 | — 2.86 | — | 2.00 | — | 7.38 | — | — 1.66 | — 1.22 |
| (128 hrs) | 12.46 — | 2.57 — | 1.83 — | 1.60 | — | 1.70 | — | — | — — | — — |
| (144 hrs) | — 3.48 | — 3.38 | — 2.43 | — | 1.84 | — | 2.20 | — | — 1.50 | — 1.14 |
| (288 hrs) | — 1.99 | — 2.07 | — 1.84 | — | 1.66 | — | 1.97 | — | — 1.60 | — 1.11 |
| (670 hrs) | — — | — — | — — | — | — | — | — | — | — — | — — |
| Water aged at 82° C. | | | | | | | | | | |
| ⅛" Notched Izod ft lbs/in | | | | | | | | | | |
| (0 day) | 17.32 17.45 | 17.61 17.99 | 17.98 17.33 | 17.58 | 17.58 | 17.13 | 17.40 | 16.87 | 14.51 17.50 | 13.30 16.17 |
| (1 day) | 17.71 17.84 | 13.18 18.06 | 3.39 1.76 | 7.95 | 1.30 | 1.36 | 17.80 | 1.07 | 1.34 16.40 | 0.21 1.50 |
| (3 days) | 17.84 12.43 | 17.11 17.32 | 0.60 1.15 | 1.02 | 0.94 | 1.36 | 19.27 | 0.60 | 0.58 0.24 | — 0.99 |
| (6 days) | 18.08 12.66 | 17.42 17.69 | 1.02 0.94 | — | 0.58 | — | 2.20 | — | — 2.61 | — 0.79 |
| (12 days) | 17.53 12.25 | 17.24 12.48 | 0.55 0.81 | — | 0.53 | — | 1.86 | — | — — | — 0.51 |
| (24 days) | — 12.76 | — 8.02 | — 0.53 | — | — | — | 1.55 | — | — — | — — |

TABLE IX

EFFECT ON CRITICAL THICKNESS PROPERTIES OF M-50 COMPOUNDED WITH VARIOUS ADDITIVES DURING OVEN AGING AT 130° C. AND WATER AGING AT 82° C.

| | Cadmium 2-ethyl-hexanoate | Cadmium Laurate | Cadmium Octoate | Cadmium Valerate | Cadmium Palmitate | Cadmium Myristate | Cadmium Octoate/ Phenyl diphenyl phosphinite | |
|---|---|---|---|---|---|---|---|---|
| Additive Wt % | 0.05 | 0.042 | 0.033 | 0.026 | 0.052 | 0.047 | 0.059/0.041 | 0.177/0.122 |
| Oven Aging at 105° C. | | | | | | | | |
| 0 hr | 212 | 207 | 202 | 187 | 182 | 182 | 167 | 152 |
| 4 hrs | 202 | 202 | 145 | 135 | 135 | 120 | 110 | 110 |
| 8 hrs | 150 | 160 | 137 | 132 | 122 | 112 | 112 | <100 |
| 16 hrs | 145 | 142 | 122 | 122 | 122 | 112 | 112 | <100 |
| 32 hrs | 142 | 137 | 135 | 122 | 122 | 102 | 102 | |
| 64 hrs | 132 | 125 | 115 | 112 | 105 | 100 | <100 | |
| 128 hrs | 132 | 122 | 102 | 102 | 102 | 100 | <100 | |
| Aged at 82° C. in H₂O | | | | | | | | |
| 0 day | 212 | 207 | 202 | 187 | 182 | 182 | 167 | 152 |
| 1 day | 192 | 192 | <120 | <120 | <100 | <100 | <100 | <100 |
| 3 days | 177 | 165 | <100 | 105 | <100 | <100 | <100 | <100 |
| 6 days | 177 | 172 | | | | | | |
| 12 days | 172 | 167 | | | | | | |

TABLE X

Water Aged (82° C.) Tensile Properties of Polycarbonates Compounded with Various Cadmium Salts and Zinc Salts of Organic Acids

| Aged | Additive | Cadmium 2-ethyl-hexanoate | Cadmium Octoate | Zinc Octoate | Cadmium Laurate | Cadmium Acetate | Cadmium Octoate/ Phenyl Diphenyl Phosphinite | Cadmium Stearate |
|---|---|---|---|---|---|---|---|---|
| 0 Days | Additive Wt. % | 0.05 | 0.033 | 0.035 | 0.041 | 0.015 | 0.059/0.041  0.177/0.123 | 0.059/.041 |
| | Initial Tensile Properties | | | | | | | |
| US | Tensile Strength at Yield, psi | 9300 | 9,300 | 9,000 | 9300 | 9,100 | 9,200  9,200 | 9,300 |
| SI | Tensile Strength at Yield, MPa | 64.1 | 64.1 | 62 | 64.1 | 62.7 | 63.4  63.4 | 64.1 |
| US | Ultimate Tensile Strength, psi | 9300 | 8,600 | 9,200 | 8000 | 9,100 | 9,800  9,500 | 9,200 |
| SI | Ultimate Tensile Strength, MPa | 64.1 | 59.3 | 63.4 | 55.2 | 62.7 | 67.6  65.5 | 63.4 |
| US | Tensile Strength, Failure, psi | 9100 | 9,200 | 9,200 | 9300 | 9,000 | 9,800  8,900 | 9,100 |
| SI | Tensile Strength, Failure, MPa | 62.7 | 63.4 | 63.4 | 64.1 | 62 | 67.6  61.4 | 62.7 |
| | Elongation, Yield % | 8 | 9 | 5 | 8 | 9 | 8  8 | 8 |
| | Ultimate Elongation % | 105 | 40–105 | 110 | 100 | 100 | 114  25–118 | 100 |

TABLE X-continued

Water Aged (82° C.) Tensile Properties of Polycarbonates Compounded with Various Cadmium Salts and Zinc Salts of Organic Acids

| Aged | Additive | Cadmium 2-ethyl-hexa-noate | Cadmium Octoate | Zinc Octoate | Cadmium Laurate | Cadmium Acetate | Cadmium Octoate/Phenyl Diphenyl Phosphinite | Cadmium Stearate |
|---|---|---|---|---|---|---|---|---|
| 3 Days (72 hours) | | | | | | | | |
| US | Tensile Strength at Yield, psi | 9400 | 11,700 | 10,300 | 9500 | 9,800 | 9,000 | — | — |
| SI | Tensile Strength at Yield, MPa | 64.81 | 80.7 | 71 | 65.5 | 67.6 | 62 | | |
| US | Ultimate Tensile Strength, psi | 9400 | 11,700 | 10,700 | 9500 | 9,800 | 9,000 | 11,400 | 11,400 |
| SI | Ultimate Tensile Strength, MPa | 64.81 | 80.7 | 71 | 65.5 | 67.6 | 62 | 78.6 | 78.6 |
| US | Tensile Strength, Failure, psi | 8000 | 10,500 | 7,000 | 8000 | 7,300 | 6,800 | — | 11,400 |
| SI | Tensile Strength, Failure, MPa | 55.2 | 72.4 | 53.8 | 55.2 | 50.3 | 46.9 | | 78.6 |
| | Elongation, Yield % | 8 | 6 | 6 | 7 | 6 | 5 | — | — |
| | Ultimate Elongation % | 9–30 | 8 | 40–100 | 8–40 | 15–35 | 10–50 | 10 | 4 |
| 6 Days (144 hours) | | | | | | | | |
| US | Tensile Strength at Yield, psi | — | — | — | 9600 | 10,200 | 9,200 | — | — |
| SI | Tensile Strength at Yield, MPa | | | | 66.2 | 70.3 | 63.4 | | |
| US | Ultimate Tensile Strength, psi | 9400 | 12,300 | 9,500 | 9600 | 10,200 | 9,200 | 12,000 | 9,600 |
| SI | Ultimate Tensile Strength, MPa | 64.81 | 84.8 | 65.5 | 66.2 | 70.3 | 63.4 | 82.7 | 66.2 |
| US | Tensile Strength, Failure, psi | 9400 | 12,300 | 9,500 | 7100 | 8,400 | 6,600 | — | 9,600 |
| SI | Tensile Strength, Failure, MPa | 64.81 | 84.8 | 65.5 | 49 | 58 | 45.5 | | 66.2 |
| | Elongation, Yield % | — | — | — | 7 | 8 | 5 | — | — |
| | Ultimate Elongation % | 7 | 6 | 2 | 8–90 | 8–60 | 6 | 5 | 4 |
| 12 Days (288 hours) | | | | | | | | |
| US | Tensile Strength at Yield, psi | 9300 | — | — | — | 10,200 | 10,000 | — | — |
| SI | Tensile Strength at Yield, MPa | 64.1 | | | | 70.3 | 69 | | |
| US | Ultimate Tensile Strength, psi | 9100 | 10,600 | Samples Cracked | 9700 | 10,200 | 10,000 | 10,500 | 4,600 |
| SI | Ultimate Tensile Strength, MPa | 62.7 | 73 | | 66.9 | 70.3 | 69 | 72.4 | 3 |
| US | Tensile Strength, Failure, psi | 9000 | 10,600 | | 9700 | 8,400 | 9,100 | 10,500 | 4,600 |
| SI | Tensile Strength, Failure, MPa | 62 | 73 | | 66.9 | 58 | 62.7 | 72.4 | 31.7 |
| | Elongation, Yield % | 8 | | | — | 5 | 8 | — | — |
| | Ultimate Elongation % | 7 | | | 6 | 5–80 | 6–12 | 3 | 3 |
| 24 Days (576 hours) | | | | | | | | |
| US | Tensile Strength at Yield, psi | — | — | — | 9800 | 10,800 | 10,000 | — | — |
| SI | Tensile Strength at Yield, MPa | | | | 67.5 | 74.5 | 69 | | |
| US | Ultimate Tensile Strength, psi | 9400 | 5,500 | 3,100 | 9800 | 10,800 | 10,000 | 4,700 | 1,200 |
| SI | Ultimate Tensile Strength, MPa | 64.81 | 38 | 21 | 67.5 | 74.5 | | 32 | 8.3 |
| US | Tensile Strength, Failure, psi | 9400 | 5,500 | 3,100 | 9000 | 9,700 | 9,100 | — | 1,200 |
| SI | Tensile Strength, Failure, MPa | 64.81 | 38 | 21 | 62 | 67 | 62.7 | | 8.3 |
| | Elongation, Yield % | 5 | 2 | — | 6 | 5 | 5 | — | — |
| | Ultimate Elongation % | — | — | 1 | 1 | 8 | 6 | 1 | 1 |

TABLE XI

Dry Air Aged (130° C.) Tensile Properties of Polycarbonates Compounded with Various Cadmium Salts and Zinc Salts of Organic Acids

| Aged | Additive | Cadmium-2-Ethyl-Hexanoate | Cadmium Octoate | Zinc Octoate | Cadmium Laurate | Cadmium Acetate | Cadmium Octoate/Phenyl Diphenyl Phosphinite | Cadmium Stearate |
|---|---|---|---|---|---|---|---|---|
| | Additive Wt. % | 0.05 | 0.033 | 0.035 | 0.041 | 0.015 | 0.059/0.041 | 0.177/0.152 | 0.056 |
| 0 Days | Initial Tensile Properties | | | | | | | | |
| US | Tensile Strength at Yield, psi | 9,300 | 9,300 | 9,000 | 9,300 | 9,100 | 9,200 | 9,200 | 9,300 |
| SI | Tensile Strength at Yield, MPa | 64.1 | 64.1 | 62 | 62 | 62.7 | 63.4 | 63.4 | 64.1 |
| US | Ultimate Tensile Strength, psi | 9,300 | 8,600 | 9,200 | 9,300 | 9,100 | 9,800 | 9,500 | 9,200 |
| SI | Ultimate Tensile Strength, MPa | 63.4 | 59.3 | 63.4 | 64.1 | 62.7 | 67.6 | 65.5 | 63.4 |
| US | Tensile Strength, Failure, psi | 9,100 | 9,700 | 9,200 | 9,000 | 9,000 | 9,800 | 8,900 | 9,100 |
| SI | Tensile Strength, Failure, MPa | 62.7 | 66.9 | 63.4 | 62 | 62 | 67.6 | 61.4 | 62.7 |
| | Elongation, Yield % | 8 | 9 | 5 | 8 | 9 | 8 | 8 | 8 |
| | Ultimate Elongation % | 105 | 40–105 | 110 | 100 | 100 | 114 | 25–118 | 105 |
| 3 Days | | | | | | | | | |
| US | Tensile Strength at Yield, psi | 10,800 | 11,400 | 11,400 | 10,900 | 11,000 | 10,400 | 10,900 | 11,600 |
| SI | Tensile Strength at Yield, MPa | 74.5 | 78.6 | 78.6 | 75.1 | 75.8 | 71.7 | 75.1 | 80 |
| US | Ultimate Tensile Strength, psi | 10,900 | 11,400 | 11,400 | 10,900 | 11,000 | 10,400 | 10,900 | 11,600 |
| SI | Ultimate Tensile Strength, MPa | 75.1 | 78.6 | 78.6 | 75.1 | 75.8 | 71.7 | 75.1 | 80 |
| US | Tensile Strength, Failure, psi | 9,800 | 9,100 | 8,800 | 9,900 | 11,000 | 10,400 | 10,900 | 11,600 |
| SI | Tensile Strength, Failure, MPa | 67.6 | 62.7 | 60.7 | 68.3 | 75.8 | 71.7 | 75.1 | 80 |
| | Elongation, Yield % | 5 | 5 | 6 | 5 | 5 | 8 | 5 | 5 |
| | Ultimate Elongation % | | 40–60 | | 7–60 | 75–105 | 80–105 | 50–110 | 5–35 |
| 6 Days | | | | | | | | | |
| US | Tensile Strength at Yield, psi | 10,300 | 10,800 | 10,600 | 10,300 | 10,600 | 10,600 | 11,200 | 10,600 |
| SI | Tensile Strength at Yield, MPa | 71.1 | 74.5 | 73.1 | 71.1 | 73.1 | 73.1 | 77.2 | 73.1 |
| US | Ultimate Tensile Strength, psi | 10,300 | 10,800 | 10,700 | 10,300 | 10,300 | 10,600 | 11,200 | 9,700 |

TABLE XI-continued

Dry Air Aged (130° C.) Tensile Properties of Polycarbonates Compounded with Various Cadmium Salts and Zinc Salts of Organic Acids

| Aged | Additive | Cadmium-2-Ethyl-Hexanoate | Cadmium Octoate | Zinc Octoate | Cadmium Laurate | Cadmium Acetate | Cadmium Octoate/Phenyl Diphenyl Phosphinite | Cadmium Stearate |
|---|---|---|---|---|---|---|---|---|
| SI | Ultimate Tensile Strength, MPa | 73.1 | 74.5 | 73.8 | 71.1 | 71.1 | 73.1 | 77.2 | 66.9 |
| US | Tensile Strength, Failure, psi | 8,600 | 7,800 | 9,700 | 7,600 | 8,300 | 8,000 | 7,600 | 8,600 |
| SI | Tensile Strength, Failure, MPa | 59.3 | 53.8 | 66.9 | 52.4 | 57.2 | 55.2 | 52.4 | 59.3 |
|  | Elongation, Yield % | 8 | 7 | 4 | 6 | 4 | 10 | 5 | 4 |
|  | Ultimate Elongation % | 100 |  |  | 7-25 | 7-20 | 60-115 | 5-70 | 2-7 |
| 12 Days | Tensile Strength at Yield, psi | 11,000 | 11,000 | — | 11,000 | 12,200 | 11,400 | — | — |
|  | Tensile Strength at Yield, MPa | 75.8 | 75.8 | — | 75.8 | 84.1 | 78.6 | — | — |
|  | Ultimate Tensile Strength, psi | 11,000 | 11,800 | 6,000 | 11,000 | 11,200 | 11,400 | 10,600 | — |
|  | Ultimate Tensile Strength, MPa | 75.8 | 81.4 | 41.4 | 75.8 | 77.2 | 78.6 | 73.1 | — |
|  | Tensile Strength, Failure, psi | 10,000 | 11,800 | 6,000 | 9,900 | 10,000 | 9,100 | 10,600 | — |
|  | Tensile Strength, Failure, MPa | 70 | 81.4 | 41.4 | 68.3 | 70 | 62.7 | 73.1 | — |
|  | Elongation, Yield % | 10 | 10 | — | 10 | 5 | 8 | — | — |
|  | Ultimate Elongation % | 10-100 | 10 | 2 | 10-55 | 5-15 | 10-75 | 6 | — |
| 24 Days | Tensile Strength at Yield, psi | — | — | — | — | 10,700 | 11,300 | — | — |
|  | Ultimate Tensile Strength, psi | 9,700 | 3,900 | 1,050 | 9,800 | 10,700 | 11,300 | Samples degraded totally | 2,700 |
|  | Tensile Strength, Failure, psi | 9,800 | 3,900 | 1,050 | 9,800 | 8,500 | 10,100 |  | 2,700 |
|  | Elongation, Yield % |  |  |  |  | 6 | 5 |  |  |
|  | Ultimate Elongation % | 6 |  |  |  | 12 | 10 |  |  |

TABLE XII

COLOR RETENTION AT 550° F. AND 700° F. MOLDINGS AS WELL AS AGING PROPERTIES

|  |  | 550° F. |  | 700° F. |  | OVEN AGED AT 130° C. |  |  |  |  |  |
|---|---|---|---|---|---|---|---|---|---|---|---|
|  |  |  |  |  |  | 6 days |  | 12 days |  | 24 days |  |
|  | Wt % | Y % | YI | Y % | YI | Y % | YI | Y % | YI | Y % | YI |
| Cadmiun 2-ethylhexanoate | 0.05 | 88.23 | 3.3 | 88.26 | 3.3 | 88.39 | 4.9 | 87.17 | 10.4 | 88.06 | 6.0 |
|  |  | 88.47 | 3.6 | 88.52 | 4.0 | 88.02 | 4.1 | 88.37 | 4.1 | 88.26 | 4.5 |
| Cadmium Laurate | 0.042 | 88.01 | 3.7 | 87.77 | 6.4 | 88.11 | 5.2 | — | — | 87.91 | 6.3 |
| Cadmium |  | 88.16 | 4.4 | 88.17 | 5.9 | 87.64 | 5.0 | 87.86 | 5.0 | 87.45 | 5.6 |
| Cadmium Octoate | 0.033 | 87.72 | 6.3 | 59.11 | 15.1 | 87.35 | 9.0 | 86.05 | 11.2 | 85.93 | 12.3 |
|  |  | 88.55 | 7.4 | 55.26* | 61.6 | 87.81 | 9.1 | 86.81 | 11.2 | 85.82 | 14.9 |
| Cadmium Stearate | 0.056 | 88.46 | 9.4 | 42.91 | 13.4 | Not aged since specimens show a high discoloration at 550° F. and 700° F. molding. |  |  |  |  |  |
| Cadmium Acetate | 0.015 | 88.03 | 4.6 | 69.70 | 15.2 | — | — | — | — | 87.73 | 7.4 |
| Zinc Octoate | 0.035 | 88.74 | 5.2 | 70.23 | 46.9 | 87.33 | 5.8 | 87.93 | 6.5 | 86.06 | 14.0 |
| Cadmium Valerate | 0.026 | 87.60 | 5.2 | 63.89 | 33.8 | Since these compositions did not exhibit retention of impact properties during oven and water aging, the optical property aging studies were not evaluated. |  |  |  |  |  |
| Cadmium Palmitate | 0.052 | 87.83 | 8.3 | 63.76 | 41.4 |  |  |  |  |  |  |
| Cadmium Myristate | 0.047 | 87.86 | 7.5 | 65.38 | 33.2 |  |  |  |  |  |  |
| Cadmium Octoate/phenyl diphenyl phosphinite | 0.059/ 0.041 | 88.77 | 4.98 | 61.63* | 48.96* |  |  |  |  |  |  |
|  |  | — | — | — | — | 87.80 | 4.62 | 88.07 | 4.5 | 87.24 | 5.7 |
| Cadmium Octoate/phenyl diphenyl phosphinite | 0.177/ 0.123 | 82.47 | 68 | (degraded) |  |  |  |  |  |  |  |
|  |  | — | — |  |  | 76.93 | 9.10 | 76.70 | 8.2 | 74.27 | 13.7 |

*Exhibited splaying
700° F. molding with 1 min cycle
550° F. molding with 35 secs cycle From a review of the data of Tables VIII–XII, it can be noted that while several of the additives do, in fact, impart equivalent and at times superior properties to the polycarbonate composition in some tests than do the instantly claimed cadmium salts, only the instantly claimed polycarbonates containing cadmium 2-ethylhexanoate, cadmium octoate, cadmium laurate and cadmium acetate exhibit the best overall combination of tensile, impact and optical properties.

Although the invention has been described with reference to specific materials, the scope of the invention is only to be limited as is set forth in the accompanying claims.

What is claimed is:

1. A halogen-free moldable aromatic polycarbonate comprising:
   (a) an aromatic polycarbonate resin; and
   (b) a cadmium salt of an organic acid selected from the group consisting of cadmium 2-ethylhexanoate and cadmium laurate,
   characterized in that said salt is present in said polycarbonate resin in an amount between 0.01 to 0.1% by weight based on the weight of said polycarbonate resin.

2. The polycarbonate of claim 1, wherein said cadmium salt is cadmium 2-ethylhexanoate.

3. The polycarbonate of claim 1, wherein said cadmium salt is cadmium laurate.

4. A moldable aromatic polycarbonate consisting essentially of:
   (a) an aromatic polycarbonate resin; and
   (b) a cadmium salt of an organic acid selected from the group consisting of cadmium 2-ethylhexanoate, characterized in that said salt is soluble in said polycarbonate resin and present in an amount between 0.01 to 0.1% by weight based on the weight of said polycarbonate resin.

5. A moldable aromatic polycarbonate having no phosphorous containing stabilizers comprising:
   an aromatic polycarbonate resin; and
   cadmium 2-ethylhexanoate,
   characterized in that cadmium 2-ethylhexanoate is present in an amount between 0.01 to 0.1% by weight based on the weight of said polycarbonate resin.

* * * * *